(12) United States Patent
Bartell et al.

(10) Patent No.: US 12,369,099 B2
(45) Date of Patent: Jul. 22, 2025

(54) ESTABLISHING DOMAINS OF AUTHORITY FOR ROUTING TABLE UPDATES BETWEEN ROUTING DEVICES IN A FIFTH GENERATION (5G) OR OTHER NEXT GENERATION NETWORK

(71) Applicant: AT&T Intellectual Property I, L.P., Atlanta, GA (US)

(72) Inventors: John Barry Bartell, Alpharetta, GA (US); James Gordon Beattie, Jr., Bergenfield, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 189 days.

(21) Appl. No.: 18/148,691

(22) Filed: Dec. 30, 2022

(65) Prior Publication Data

US 2023/0136900 A1 May 4, 2023

Related U.S. Application Data

(63) Continuation of application No. 17/355,363, filed on Jun. 23, 2021, now Pat. No. 11,632,706, which is a continuation of application No. 16/804,568, filed on Feb. 28, 2020, now Pat. No. 11,071,041.

(51) Int. Cl.
*H04W 40/24* (2009.01)
*H04L 45/00* (2022.01)
*H04L 45/02* (2022.01)
*H04W 84/04* (2009.01)

(52) U.S. Cl.
CPC ........... *H04W 40/248* (2013.01); *H04L 45/04* (2013.01); *H04L 45/20* (2013.01); *H04W 84/042* (2013.01)

(58) Field of Classification Search
CPC .. H04W 40/248; H04W 84/042; H04L 45/20; H04L 45/04
See application file for complete search history.

(56) References Cited

U.S. PATENT DOCUMENTS

| | | | | |
|---|---|---|---|---|
| 5,964,841 | A * | 10/1999 | Rekhter | H04L 45/20 370/255 |
| 11,071,041 | B1 | 7/2021 | Bartell et al. | |
| 2011/0085546 | A1 * | 4/2011 | Capello | H04L 45/16 370/389 |

(Continued)

OTHER PUBLICATIONS

Notice of Allowance received for U.S. Appl. No. 16/804,568 dated Mar. 19, 2021, 28 pages.

(Continued)

*Primary Examiner* — Hashim S Bhatti
(74) *Attorney, Agent, or Firm* — Guntin & Gust, PLC; Miyoung Shin

(57) ABSTRACT

The technologies described herein are generally directed toward establishing a domain of authority for routing table updates from a routing device. According to an embodiment, a system can comprise a processor and a memory that can enable operations facilitating performance of operations including identifying a route update that comprises information about a network. According to the embodiment, the operations can further include communicating, via the network, the route update to a second routing device for propagation of the route update to routing devices in a first authority domain with the first routing device.

20 Claims, 10 Drawing Sheets

(56) References Cited

U.S. PATENT DOCUMENTS

2011/0280123 A1* 11/2011 Wijnands .............. H04L 45/507
370/228

OTHER PUBLICATIONS

Bartell "Selectively Rerouting Network Traffic in a Fifth Generation (5G) Other Next Generation Network" U.S. Appl. No. 16/793,283, filed Feb. 18, 2020, 48 pages.

Bartell, "Selectively Shedding Processing Loads Associated With Updates To a Routing Table in a Fifth Generation {5G) or Other Next Generation Network", U.S. Appl. No. 16/793,508, filed Feb. 18, 2020, 50 pages.

Bartell, et al. "Selectively Bypassing a Routing Queue in a Routing Device in a Fifth Generation (5G) or Other Next Generation Network", U.S. Appl. No. 16/794,534, filed Feb. 19, 2020, 46 pages.

Bartell "Selectively Sending Routing Information to Routing Devices in a Fifth Generation (5G) or Other Next Generation Network" U.S. Appl. No. 16/804,429, filed Feb. 28, 2020, 43 pages.

Bartell, "Selectively Using a Co-Processor to Process Network Routing Information in a Fifth Generation (5G) or Other Next Generation Network", U.S. Appl. No. 16/804,521, filed Feb. 28, 2020, 54 pages.

Notice of Allowance mailed Aug. 24, 2022 for U.S. Appl. No. 17/355,363, 26 pages.

\* cited by examiner

ESTABLISHING DOMAINS OF AUTHORITY FOR ROUTING TABLE UPDATES BETWEEN ROUTING DEVICES IN A FIFTH GENERATION (5G) OR OTHER NEXT GENERATION NETWORK

RELATED APPLICATIONS

The subject patent application is a continuation of, and claims priority to each of, U.S. patent application Ser. No. 17/355,363, filed Jun. 23, 2021, and entitled "ESTABLISHING DOMAINS OF AUTHORITY FOR ROUTING TABLE UPDATES BETWEEN ROUTING DEVICES IN A FIFTH GENERATION (5G) OR OTHER NEXT GENERATION NETWORK," which is a continuation of U.S. patent application Ser. No. 16/804,568 (now U.S. Pat. No. 11,071,041), filed Feb. 28, 2020, and entitled "ESTABLISHING DOMAINS OF AUTHORITY FOR ROUTING TABLE UPDATES BETWEEN ROUTING DEVICES IN A FIFTH GENERATION (5G) OR OTHER NEXT GENERATION NETWORK," the entireties of which priority applications are hereby incorporated by reference herein.

TECHNICAL FIELD

The subject application is related to computer networking, and, for example, using a router to select network traffic routes in a fifth generation (5G) or other next generation network.

BACKGROUND

As networks continue to be expanded to handle larger amounts of information, the need for rapid and efficient routing within networks continues to increase. This is especially true when existing networks are used to carry larger traffic before hardware capabilities have been increased.

With traditional routing strategies, routing devices can receive routing information from other, different routing devices, with continual hardware upgrades matching increases in network use. With recent dramatic increases in demand for network bandwidth however, in some circumstances, even traditional hardware upgrades can be rendered ineffective. For example, in some circumstances, because of increases in network capacity requirements, the content, amount, and frequency of updates to routing information shared between routing devices can fail to sufficiently model network conditions.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
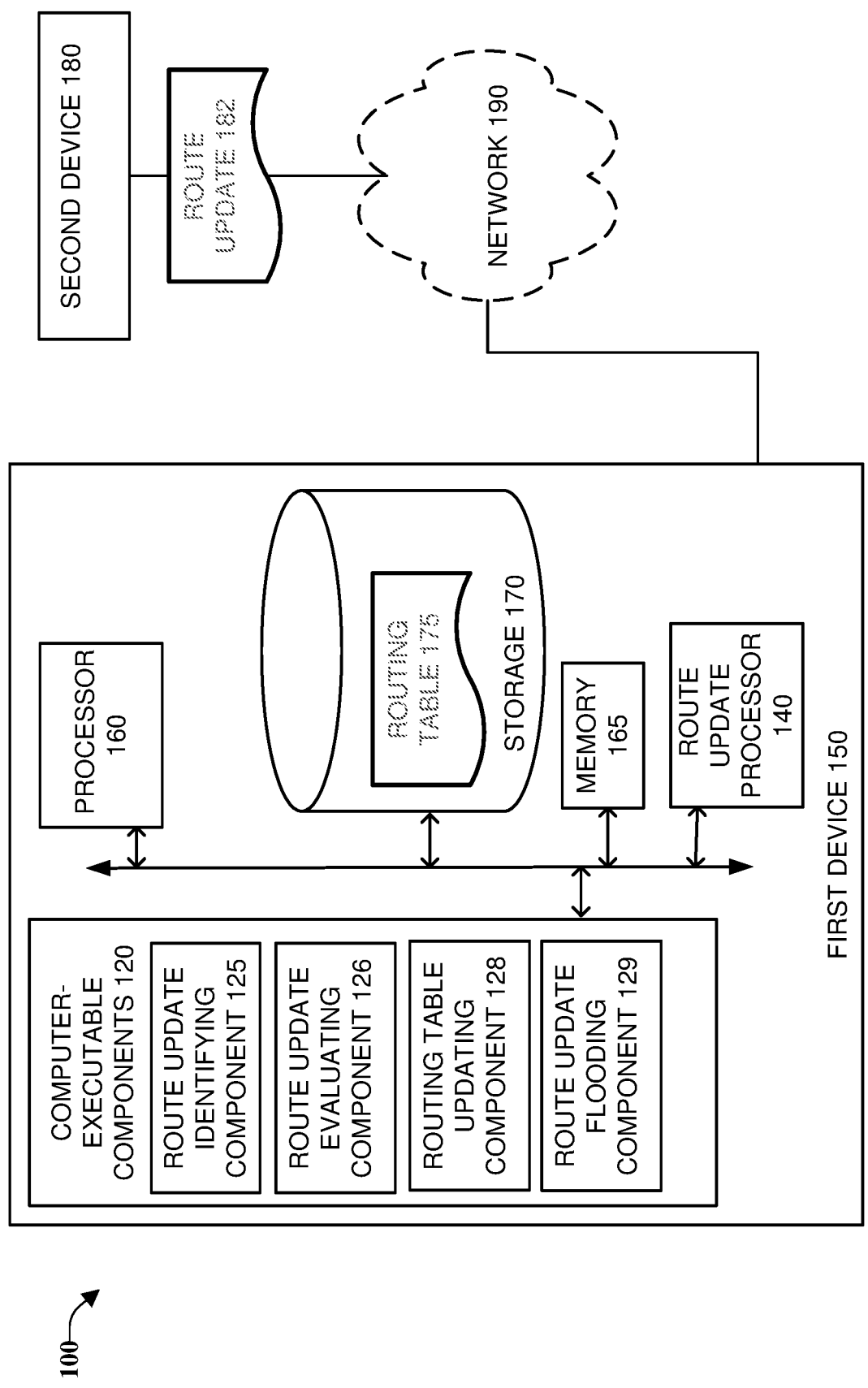
FIG. 1 is an architecture diagram of an example system that can facilitate establishing a domain of authority for routing table updates from a routing device, in accordance with one or more embodiments.

Generally speaking, one or more embodiments can provide improved routing among multiple routing devices, in fifth generation (5G) or other next generation networks. In some implementations, one or more embodiments can facilitate establishing a relativistic routing approach that frequently identifies and distributes among routers, useful information about network conditions, e.g., to facilitate improved routing among multiple devices.

In addition, one or more embodiments described herein can be directed towards a multi-connectivity framework that supports the operation of New Radio (NR, sometimes referred to as fifth generation (5G)). As will be understood, one or more embodiments can allow an integration of user equipment (UEs) with network assistance, by supporting control and mobility functionality on cellular links (e.g. LTE or NR). One or more embodiments can provide benefits including, system robustness, reduced overhead, and global resource management, while facilitating direct communication links via a NR sidelink.

In some embodiments, the non-limiting term "radio network node" or simply "network node," "radio network device or simply "network device" are used herein. These terms may be used interchangeably, and refer to any type of network node that can serve user equipment and/or be connected to other network node or network element or any radio node from where user equipment receives signal. Examples of radio network nodes are Node B, base station (BS), multi-standard radio (MSR) node such as MSR BS, gNodeB, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS), etc. As noted above, some embodiments are described in particular for 5G new radio systems. The embodiments are however applicable to any radio access technology (RAT) or multi-RAT system where the user equipment operates using control signals, e.g. LTE FDD/TDD, WCMDA/HSPA, GSM/GERAN, Wi Fi, WLAN, WiMax, CDMA2000, etc.

In some embodiments, the non-limiting term router, routing device, or router device is used. This term can refer to any type of electronic device that can facilitate the connection of one or more nodes to a network, and between two or more nodes in the network, e.g., including, but not limited to, a general computer that has been configured to perform network routing functions. It should further be noted that, one or more embodiments used in examples herein utilize routers that employ an approach to network connectivity that is based on minimizing delay of networked communications by employing large numbers of route updates throughout the network, e.g., minimizing delay in a network route by making available frequently updated information about the network routes (e.g., route information and route updates discussed below) for use in planning network routes, e.g., link transmission speed, and delays.

One approach to implementing embodiments of this delay-minimizing approach that can use frequently generated route updates shared between routers. As described below, in one or more embodiments, routers can receive the route updates, rapidly process the route updates, using the processed route updates to direct or redirect network traffic to routes that can reduce delays. In addition, received route updates can be widely propagated to other networked devices. One aspect of this approach to routing is that it can utilize a router to process millions of route updates per second, with this level of route processing being improved by one or more of the embodiments described herein.

In one or more embodiments, as discussed further below, with route updates being rapidly and extensively propagated from router to router, the overhead of such an approach can be considered, along with increases in routing success that can be achieved by the approach. Further, notwithstanding the relationship between embodiments of this network routing approach and embodiments of frequent and extensive route updates used by routers described herein, some combinations of features described in one or more embodiments, and recited in the claims below, can be applied to other approaches to network routing beyond approaches described in one or more of the examples used herein.

In example approaches to routing that can beneficially employ one or more embodiments, routing devices can establish domains of authority where other networked routing devices can be affected by routing updates distributed by the routing devices. Because, in some implementations, routing updates can be rapidly propagated to other routing devices, useful results can be achieved by using one or more embodiments to limit this propagation of route updates.

It should be noted that, but facilitating the determination of whether to propagate route updates to individual routers, one or more embodiments can establish a system of distributed decision-making for routing devices of a network. Stated differently, in one or more embodiments, each router node can have a different area in which it has the best information (e.g., an authority domain), creating an area with a higher likelihood of optimization around each node. With this approach, networks can be composed of overlapping areas centered on the nodes. By frequently and extensively sharing routing information, together, the nodes can improve the likelihood of selecting the best path for a packet as it traverses the network in a distributed fashion. In some circumstances, because information exchanged between router can be delayed, the likelihood of optimization can improve the closer the packet gets to its destination.

FIG. 1 is an architecture diagram of an example system 100 that can facilitate establishing a domain of authority for routing table updates from a routing device, in accordance with one or more embodiments. For purposes of brevity, description of some elements and/or processes of embodiments discussed further below are omitted in this discussion of FIG. 1. System 100 can include first device 150 connected via network 190 to second device 180. First device 150 can include computer-executable components 120, processor 160, route update processor 140, storage 170, and memory 165. Computer-executable components 120 can include route update identifying component 125, route update evaluating component 126, routing table updating component 128, route update flooding component 129, and other computer-executable components 120 that can be used to implement aspects of system 100, as described herein. Examples of computer executable components include applications 1032 and modules 1034 of FIG. 10 discussed below.

In some embodiments, memory 165 can comprise volatile memory (e.g., random access memory (RAM), static RAM (SRAM), dynamic RAM (DRAM), etc.) that can employ one or more memory architectures. Further examples of memory 165 are described below with reference to system memory 1006 of FIG. 10 discussed below. In some embodiments, storage 170 can comprise non-volatile memory (e.g., read only memory (ROM), programmable ROM (PROM), electrically programmable ROM (EPROM), electrically erasable programmable ROM (EEPROM), etc.) that can employ one or more storage architectures. Such examples of memory 165 and storage 170 can be employed to implement any embodiments of the subject disclosure described or suggested by disclosures herein.

According to multiple embodiments, processor 160 can comprise one or more processors and/or electronic circuitry that can implement one or more computer and/or machine readable, writable, and/or executable components and/or instructions that can be stored using memory 165 and storage 170. For example, processor 160 can perform various operations that can be specified by such computer and/or machine readable, writable, and/or executable components and/or instructions including, but not limited to, logic, control, input/output (I/O), arithmetic, and/or the like. In some embodiments, processor 160 can comprise one or more central processing unit, multi-core processor, microprocessor, dual microprocessors, microcontroller, System on a Chip (SOC), array processor, vector processor, and/or another type of processor. Further examples of processor 160 are described below with reference to processor 1002 of FIG. 10 below, and processing unit 1004 of FIG. 10 discussed below. Such examples of processor 160 can be employed to implement any embodiments of the subject disclosure.

It should be noted that, in the example of FIG. 1, and throughout this disclosure, route update processor 140 is listed separately from processor 160, and this is because route updates 182 (as well as other routing information, such as routing table 175) can, in one or more embodiments, be advantageously generated, processed, and modified by different types of processors, e.g., specialized route update processors and other co-processing components. Different reasons why this is done by some implementations are discussed further below with FIGS. 2-5, e.g., because, as described further below, of the volume of route updates 182 that can be generated, processed and used by one or more embodiments to rapidly select network routes and change network routing. In this example, the route update processor 140 can generate, process, and utilize the route updates (e.g., with extensive processing), while the processor 160 can use much less processing power to utilize the generated information, e.g., routing table 175 and route updates 182. As further discussed below, route update evaluating component 126 can provide a pre-processing assessment of route updates that can reduce the amount of processing that is performed by route update processor 140. In one or more embodiments, route update processor can be a graphics processing unit, or other co-processor configured to perform parallel processing operations.

Generally, applications (e.g., computer-executable components 120) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, handheld computing devices, microprocessor-based or programmable consumer electronics, and the like, each of which can be operatively coupled to one or more associated devices.

It should be appreciated that the embodiments of the subject disclosure depicted in various figures disclosed herein are for illustration only, and as such, the architecture of such embodiments are not limited to the systems, devices, and/or components depicted therein. For example, in some embodiments, first device 150 can further comprise various computer and/or computing-based elements described herein with reference to operating environment 1000 and FIG. 10. In one or more embodiments, such computer and/or computing-based elements can be used in connection with implementing one or more of the systems, devices, components, and/or computer-implemented operations shown and described in connection with FIG. 1 or other figures disclosed herein.

As described further below, in one or more embodiments, memory 165 can store executable instructions that, when executed by the processor can facilitate performance of operations that can implement one or more embodiments described herein. For example, in one or more embodiments, the operations can implement route update identifying component 125 that can facilitate receiving a route update for routing table 175 of first device 150 communicated via network 190 by second device 180, with the route update being associated with different aspects of network 190, e.g., a route to a network destination. Examples of routes and route updates are included with the discussion of FIG. 3-4 below. In alternative embodiments, operations can implement route update identifying component 125 that can facilitate identifying, by first device 150, a route update 182 by detecting, by the first routing device, route information corresponding to route update 182. It should be appreciated that route information that can be used by one or more embodiments is not limited examples described herein, but can be any information relevant to network 190 routing, at the current time and in the future.

In one or more embodiments, memory 165 can further store executable instructions that, when executed by the processor can facilitate performance of operations that can implement route update evaluating component 126. In one or more embodiments, route update evaluating component 126 can evaluate a value of route update 182, resulting in an evaluated value of the route update. As described throughout this disclosure, in one or more embodiments, the value of route update 182 can describe the usefulness of the route update for efficiently routing network traffic.

In one or more embodiments memory 165 can further store executable instructions that, when executed by the processor can facilitate performance of operations that can implement route routing table updating component 128. In one or more embodiments, routing table updating component 128 can, as discussed further below, update an entry of routing table 175 based on route update 175 and the evaluated value of route update 182, e.g., by route update evaluating component 128.

In one or more embodiments memory 165 can further store executable instructions that, when executed by the processor can facilitate performance of operations that can implement route routing table flooding component 129. In one or more embodiments, routing table flooding component 129 can, as discussed further below, selectively propagate route updates to other routing devices throughout network 190. Some embodiments can use a flooding protocol to distribute route updates because, as described further herein, with some exceptions, changes in routing information identified by routers (e.g., route updates) can be immediately propagated (e.g., using a flooding control protocol) to adjacent nodes, with these nodes in some cases discussed below, further flooding the updated information to adjacent nodes.

Figure 2:
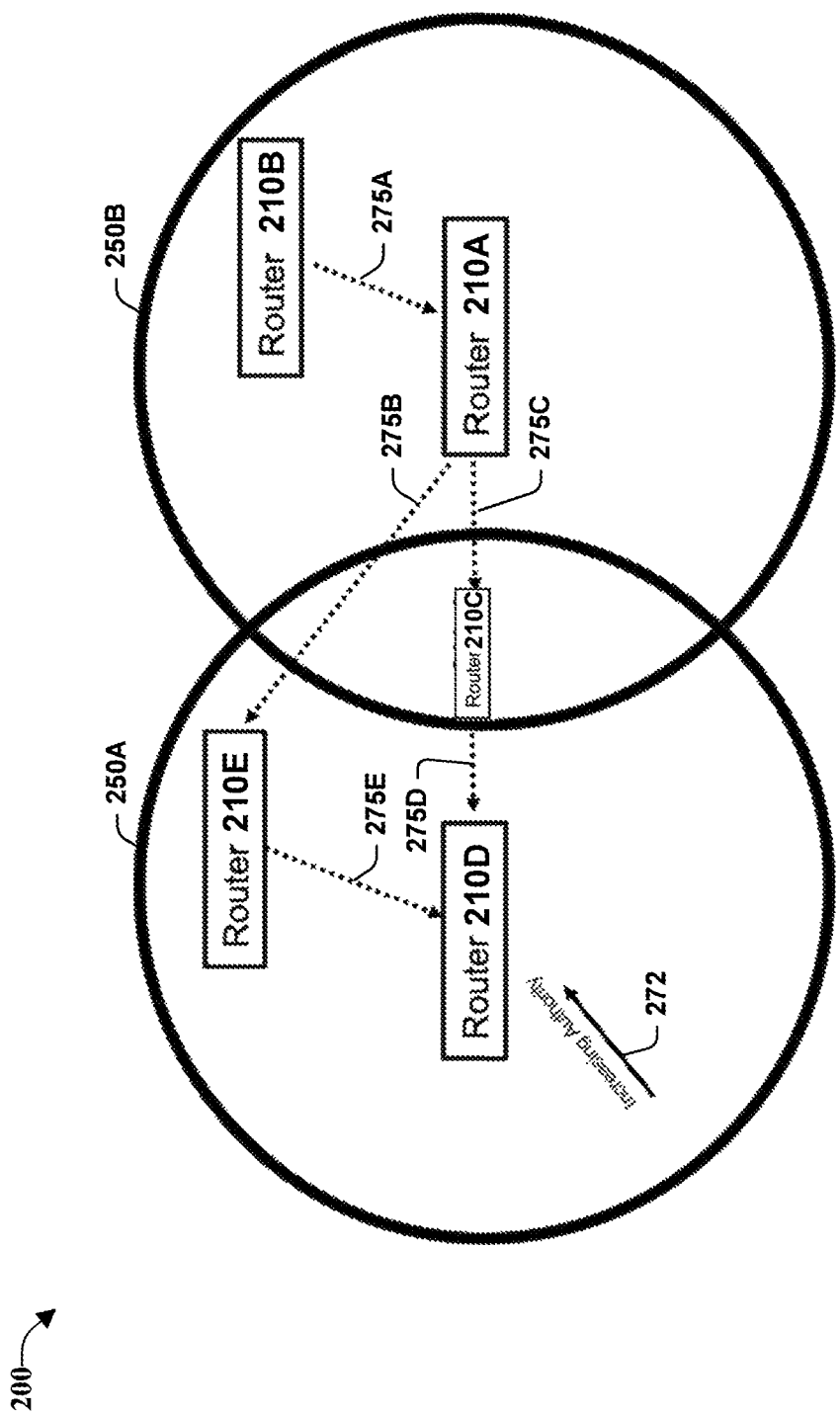
FIG. 2 depicts a diagram of an example network having routers with authority domains for shared routing table updates, in accordance with one or more embodiments.

FIG. 2 depicts a diagram of an example network 200 having routers with authority domains for shared routing table updates, in accordance with one or more embodiments. For purposes of brevity, description of like elements and/or processes employed in other embodiments is omitted. Network 200 includes authority domains 250A-B with various routers 210A-E included in one or both authority domains 250A-B. Authority domain 250A includes routers 210E and 210D, authority domain 250B includes routers 210A-B, router 210C is included in both domains 250A-B. Asynchronous links 275A-E are depicted as coupling various routers 210A-E.

In one or more embodiments, network 200 is, as described above, a network that can exchange routing information between routers 210A-E for various reasons, e.g., to maintain routing tables local to each router for use selecting from available routers when forwarding communications (e.g., packets) toward a destination router. In one or more embodiments, route update information can be collected, analyzed, and communicated to connected routers at very short intervals, e.g., in some implementations, as frequently as 10 ms. In an approach that can be used by one or more embodiments to make this frequent updating approach less processing intensive, one or more embodiments can limit the distribution of route updates in different ways. The example network 200 is used to illustrate the definition of authority domains 250A-B, and describe the different types of links that can be maintained between routing devices, e.g., synchronous links 275A-E, and asynchronous link 278.

Generally speaking, in one or more updates, route updates can be valued (e.g., assigned an authority value based on the age of the information, e.g., older updates can have less authority because they have a higher likelihood of less accurately reflecting the present status of network components on which they report. Stated differently, upon receipt by router, the estimated value of a route update can be inversely proportional to the time since the information for the route update was collected. Thus, in one or more embodiments, to improve the accuracy of distributed route updates, the extensive generation and propagation of route updates can be strategically limited by time, e.g., because route updates that are too old can be less accurate. In addition, by limiting the time that route updates can be propagated, one or more embodiments can limit the physical distance from the source that a route update can travel, e.g., the distance that a signal can travel during the limited time available, as currently defined by the speed of light (c). An authority value of routing information can be generated by different approaches, with examples being discussed further with FIGS. 4 and 5 below.

Reasons the physical limits to the propagation of route updates can be advantageous to the operation of some embodiments is that route updates generated by parts of a network that are distant (e.g., take longer to arrive than closer sources) to a router can, in addition to being old, have less applicability to the part of the network that is local to a router. In one or more embodiments, limits imposed on the exchange route information within and between authority domains can, in different implementations, advantageously balance the profusion of useful information collected and exchanged with a potential for information processing overload at network routers.

In one or more embodiments, a time limit for propagation of a route update can be termed the time to live (TTL) of the route update, e.g., route updates can continue to be forwarded and evaluated, and until the time to live (TTL) of the information is exceeded, that is, a particular amount of time elapses since the route update was generated, or the route updates a forwarded a certain number of times, with each forward to a new routing device also being termed a hop. This follows a general principle of one or more embodiments, this being that the usefulness of information can be discounted by the age of the information, this discount being for reasons including, but not limited to, the older the information is, the higher the likelihood it is no longer accurate to some degree. The use of TTL limit by one or more embodiments for a variety of reasons is described further in FIGS. 2-5 below, e.g., including in a formula to determine an authority value for a route update.

As further discussed below, the processing and use of route updates received by a router can also be limited based on information already available to the router, e.g., newer or older versions of the same information stored in routing table 175. In this process, as discussed further below, when a route update is received about a particular aspect of network 190 (e.g., a measure of delay to a destination router), routing table 175 local to the router can be queried, and if the route update information has a higher determined authority that a determined authority for the information currently in routing table 175, the information in the routing table can be replaced with the more authoritative route update information received.

As discussed further below, because on a network, the age of an update can reflect the distance from a source of the update, defining a maximum time an update can travel (e.g., TTL), can in effect define a size of a domain that can be influenced by the route update, e.g., the area (domain) upon which router that generated the route update has authority (the authority domain.) Stated differently, by limiting the time of propagation of a route update, an authoritative domain can be created around the router that generates the route update, e.g., because routers of the network can be configured to, once route updates exceed a particular TTL age, stop forwarding the route updates to other routers. Based upon different limited to propagation discussed and suggested herein, routers configured to operate with different embodiments herein (e.g., capable of handling large amounts of frequent updates) can, in some circumstances work similar to legacy routers, e.g., with routing tables updated with less information and less frequently.

Based on the approaches described and suggested herein, can deliver network delay comparable to that of point to point fiber, and performance better and more responsive than existing a wide area network (WAN) routing protocols. For example, of the four elements of packet delay, two can predominate in high speed networks: propagation delay and queuing delay. Propagation delay can be predetermined by the speed of light in fiber, queuing delay can be reduced, in one more embodiments by using small queues that are able to be traversed in short periods of time, e.g., 250 µsec. Part of the management of the small queues that can be utilized by one or more embodiments, is the generation of a route update for other routers whenever a queue changed in an increment of delay, e.g., adjacent routers can be notified for every 50 µsec change in the delay of queue, with these notifications, turn, being subject to propagation to other routers.

In an example based on the embodiment depicted in FIG. 2, router 210A can identify information about network 200, e.g., information relevant to routing information within network 200, such as queueing delays, transit times between routers, etc. Different approaches to identifying routing information are discussed below with network arrangements depicted in FIGS. 4-5. Continuing the example of FIG. 2, upon identification of the route information, router 210A can determine whether to update a local routing table 175, and generate a route update 182 for propagation to other network devices.

In one or more embodiments, route updates can be propagated to directly connected routing devices when identified, e.g., asynchronously, not by time but by the information discovery triggering event. Different events that can trigger asynchronous updates are discussed further herein. In other circumstances, routing updates can be propagated at regular intervals (e.g., synchronously) with connected routing devices. In an example implementation, this interval can 10 µsec. One having skill in the relevant art(s), given the description herein, would appreciate that this approach, with asynchronous and synchronous updates in different circumstances, can be used by on one or more embodiments both to rapidly share important information (e.g., asynchronous updates), and also assure that updates are propagated frequently, even when no triggering event occurs, e.g., synchronous updates.

In this example, a route update can be propagated from router 210A to directly-connected routers 210B-C, e.g., by route update flooding component 129 using a flooding protocol to propagate the route update. In this example, router 210A is depicted as centrally located within authority domain 250B, this being because authority domain 250B is defined by the influence of route updates communicated from router 210A, e.g., route updates can only travel a particular distance from router 210A in time defined by some embodiments, and beyond this distance, router 210A does not have authority with other routing devices.

In this example, the generated route update can reach routers 210B-C, e.g., because of the propagation time specified by one or more embodiments, and the length of the links between router 210A and routers 210B-C. In additional embodiments, in routing table 175 of router 210A, an entry exists that lists routers 210D-E and taking longer for receipt than remains in the time limit for propagation of the route update, e.g., in contrast to the propagation to routers 210B-C discussed above. It should be noted that, direct link 275B links router 210A to router 210E, while router 210D is linked by links 275C-D via router 210C.

It is illustrative of the definition of domains by one or more embodiments that router 210C is within authority domain 250B, while router 210D is not within authority domain 250B. This limit of the extent of authority domain 250B can be enforced, for example, by router 210C checking the propagation time limit of the route update upon receipt of the route update from router 210A, and, because no propagation time remains, the route update is not forwarded to router 210D, e.g., the information generated by router 210A is not, in this example, influencing (e.g., with authority) the routing information utilized by router 210D for routing.

Figure 3:
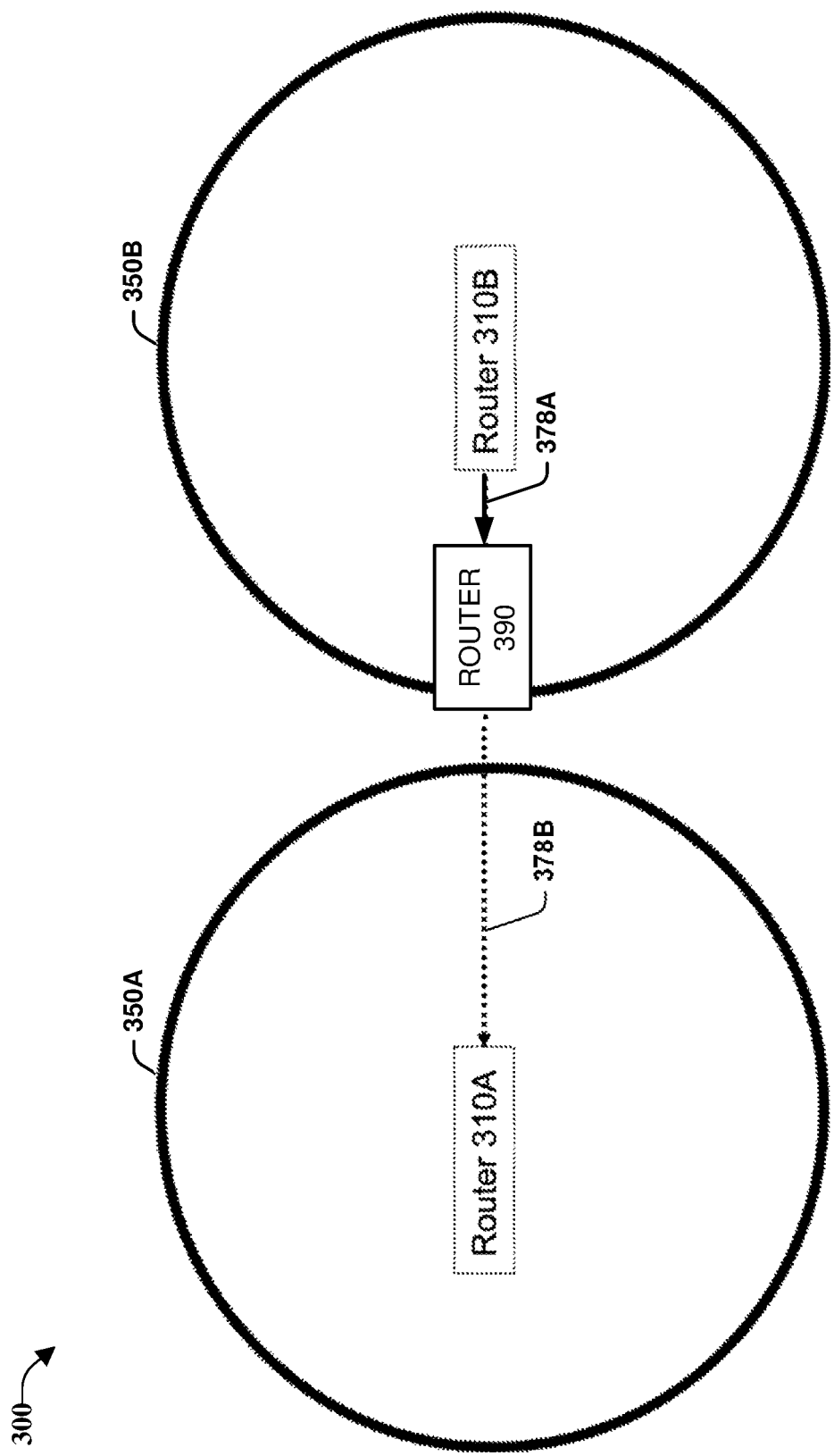
FIG. 3 depicts a diagram of an example network having routers with authority domains for shared routing table updates, in accordance with one or more embodiments.

FIG. 3 depicts a diagram of an example network 300 having routers with authority domains for shared routing table updates, in accordance with one or more embodiments. For purposes of brevity, description of like elements and/or processes employed in other embodiments is omitted. Network 300 includes authority domains 350A-B with routers 310A-B included respectively therein.

In an example based on FIG. 3, routers 310A-B are part of network 300, but are positioned at a distance such that a route update communicated by router 310B cannot reach router 310A within the TTL time limit specified by one or more embodiments. As noted above, because of this, routers 310A-B are set to be in different authority domains 350A-B.

In keeping with approaches used by one or more embodiments to distribute useful routing information throughout network 300, in some implementations router 310B can share routing updates with router 310A, outside of authority domain 350B. In one or more embodiments, routers can be configured to propagate a route update for one hop when the TTL of the route update first becomes negative. This configuration can, in some implementations, facilitate the operation of routers 310B and 390 in an approach that routes on delay for distance, not solely based on TTL authority.

In an example depicted in FIG. 3, a route update originating at router 310B is propagated 378A to router 390 near the end of the TTL of the route update. When the TTL goes negative on the route update, router 390 can be configured to propagate 378B the update to connected routing devices, e.g., router 310A. As discussed further with FIGS. 4 and 6 below, in one or more embodiments, when a router (e.g., router 310A) receives a route update that is negative, the router can be configured to use the information to potentially update a local routing table (e.g., as discussed herein, compare current negative authority of update with calculated authority of information currently in routing table), but the routing update is not propagated because the TTL is negative upon receipt by router 310A. Thus, router 390 propagates 378B the route update for one hop and not further, and router 310B can extend authority beyond authority domain 350B, in some circumstances.

Figure 4:
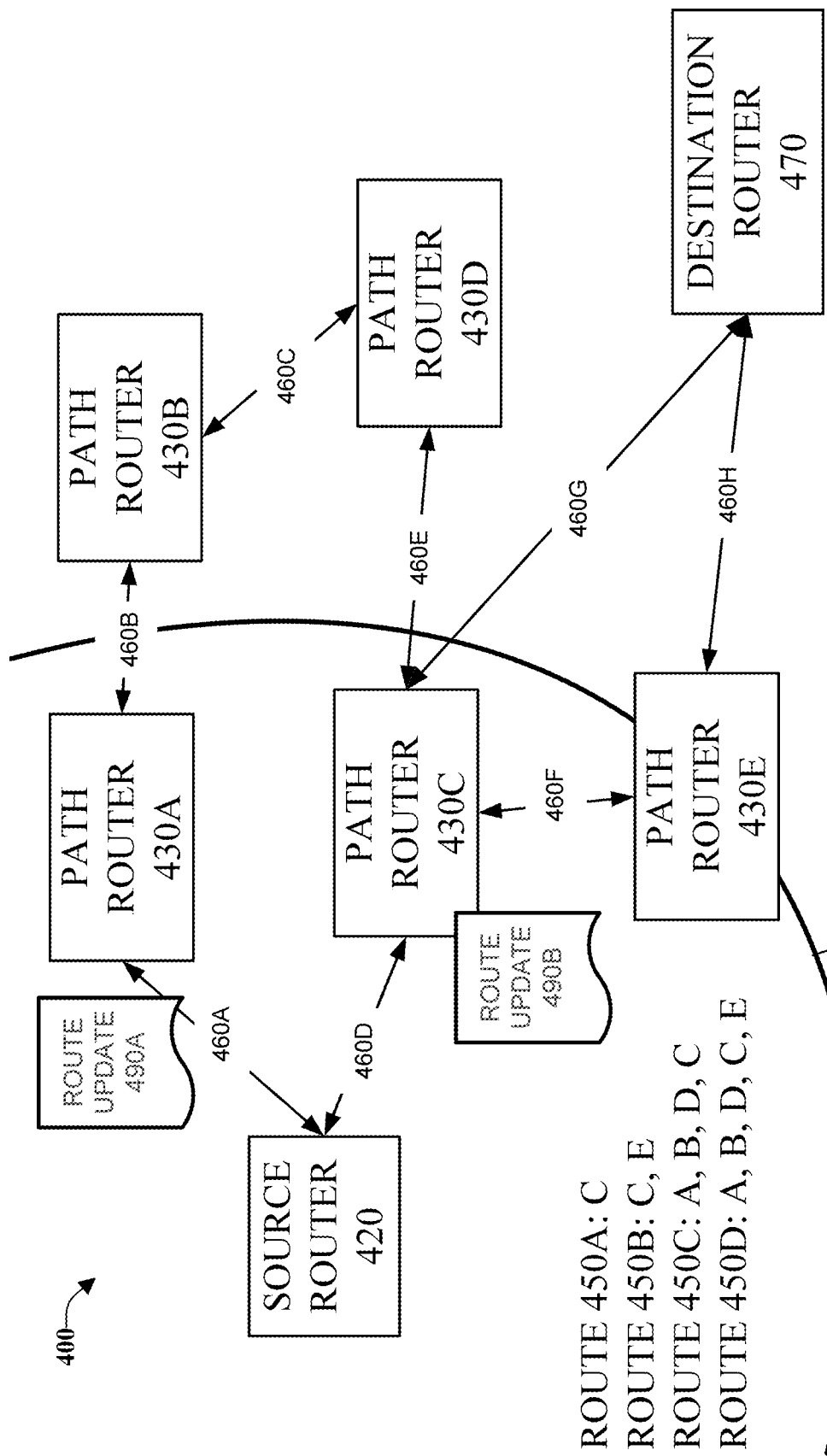
FIG. 4 illustrates an example node diagram of a network with components that can facilitate establishing a domain of authority for routing table updates from a routing device, in accordance with one or more embodiments.

FIG. 4 illustrates an example node diagram of a network with components that can facilitate establishing a domain of authority for routing table updates from a routing device, in accordance with one or more embodiments. For purposes of brevity, description of like elements and/or processes employed in other embodiments is omitted.

Network 400 includes source router 420, destination router 470, routers 430A-430E, and links 460A-H between variously depicted nodes. One having skill in the relevant art(s), given the description herein will appreciate that FIG. 4 depicts elements of an additional network routing example. In this example, packets traveling from source router 430 to destination router 470 pass through ones of routers 430A-430E along a route. Source router 420, and path routers 430A, 430C, and 430E are in authority domain 480. Example routes 450A-450D are listed on FIG. 4, and include example routes from source router 420 to destination router 470. A route update 490 is depicted being forwarded from router 430A. One having skill in the relevant art(s), given the description herein will appreciate that FIG. 4 depicts elements that can be used to illustrate different approaches to routing traffic in network 400.

In one or more embodiments, routers as depicted (e.g., 420, 430A-E, and 470) can receive and send packets of information to connected routers in accordance with a selected path towards a destination router 470, e.g., utilizing TCP/IP routing. One having skill in the relevant art(s), given the description herein, would appreciate that one approach that can be used by routers to improve the selection, for packet relay, from available routers is the use of a routing table 175, local to each router 430A-E. This routing table 175 can collect known information about network links along different paths, and facilitate the selection of the next router. For example, if source router 420 has information in a routing table 175 that corresponds to a problem with link 460B, an algorithm that selects from routers 430A and 430C can select router 430C because this problem is avoided.

In one or more embodiments, different ways can be used to populate respective routing tables 175 of routers with information about network links. One way to determine this information is by pinging adjacent nodes to test the round trip speed of a data packet. This information when gathered can be compared to information already stored in the routing table 175 of the pinging router, and if the information is determined to be useful, it can be stored in the routing table for use by the pinging node.

In an example, source router 420 can ping both routers 430A and 430C, and store the results of these pings in a routing table 175 for use routing received packets, e.g., as a determined delay between source router 420 and each of routers 430A and 430C. In an example, as described with FIG. 2 above, based on an event (e.g., the identification of the noted delays) can trigger the propagation of this information in an asynchronous update to directly connected path routers 430A-C.

In this example, when route update 490A reaches path router, the TTL of the route update can be reduced by the travel time over link 460A. As described with FIG. 5 below, one approach for path router 430A to quickly evaluate the TTL of route update 490A is for source router 420, when it sends route update 490A to path router 430A, to estimate what the TTL will be upon receipt by path router 430A, and include this estimate in route update 490A. This estimate can be immediately used by path router 430A to determine the authority of the information of the route update (e.g., for updating it local routing table 175) and for determining whether to forward route update 490A to path router 430B. In the example depicted in FIG. 4, by the time route update 490A arrives at path router 430B from source router 420, the TTL can be negative, e.g., in this implementation, it has been counted down from the initial value, reached zero, then continued to count down into the negative.

It is important to note that, in one or more embodiments, exceeding the TTL of a route update can restrict the propagation of the route update, but not the use of the route update by the receiving path router 430A. For example, upon receipt of the route update 490, source router 420 can determine that this information should be stored in its local routing table 175 for use, e.g., by evaluating the value of the information (e.g., with lower delays evaluated as having higher value), discounted by the age of the information (e.g., by the time to live (TTL) value of the route update, as discussed herein). If determined as valuable and stored in routing table 175, in one or more embodiments, the information determined by source router 420, can be stored in routing table 175 of path router 430A. One having skill in the relevant art(s) will appreciate that other information can be stored in routing table 175 without departing from the spirit of embodiments described herein. Thus, it should further be appreciated that, in some embodiments, even though the negative authority value does not prevent the update of routing table 175, the low authority value that comes from the negative TTL value can cause the information to have less authority than the information of routing table 175.

In an example that can be illustrated with network 400 of FIG. 4, route information can be identified by source router 420 that can provide routing information about a route between source router 420 and destination router 470. In FIG. 4, three routes are identified, two of which utilize link 460E, between path router 430D and destination router 470. In this example, the routing information is that link 460E is temporarily unavailable for use. This information can be identified by source router 420 in a variety of ways, including, but not limited to, receiving it from another node (e.g., path router 430D can discover this information about an immediate link 460E) and relay this route update 490 via router 430A-E to source router 420. In another example, destination router 470 can detect the malfunctioning link 460E and send route update 490 to path router 430E, where this route update can be further forwarded to path router 430C and source router 420. Other ways this information can be identified by source router 420 include detection of this unavailable link 460E, by source router 420, during a periodic ping of the route to destination router 470, this process of pinging being discussed further with FIG. 4 below.

Figure 5:
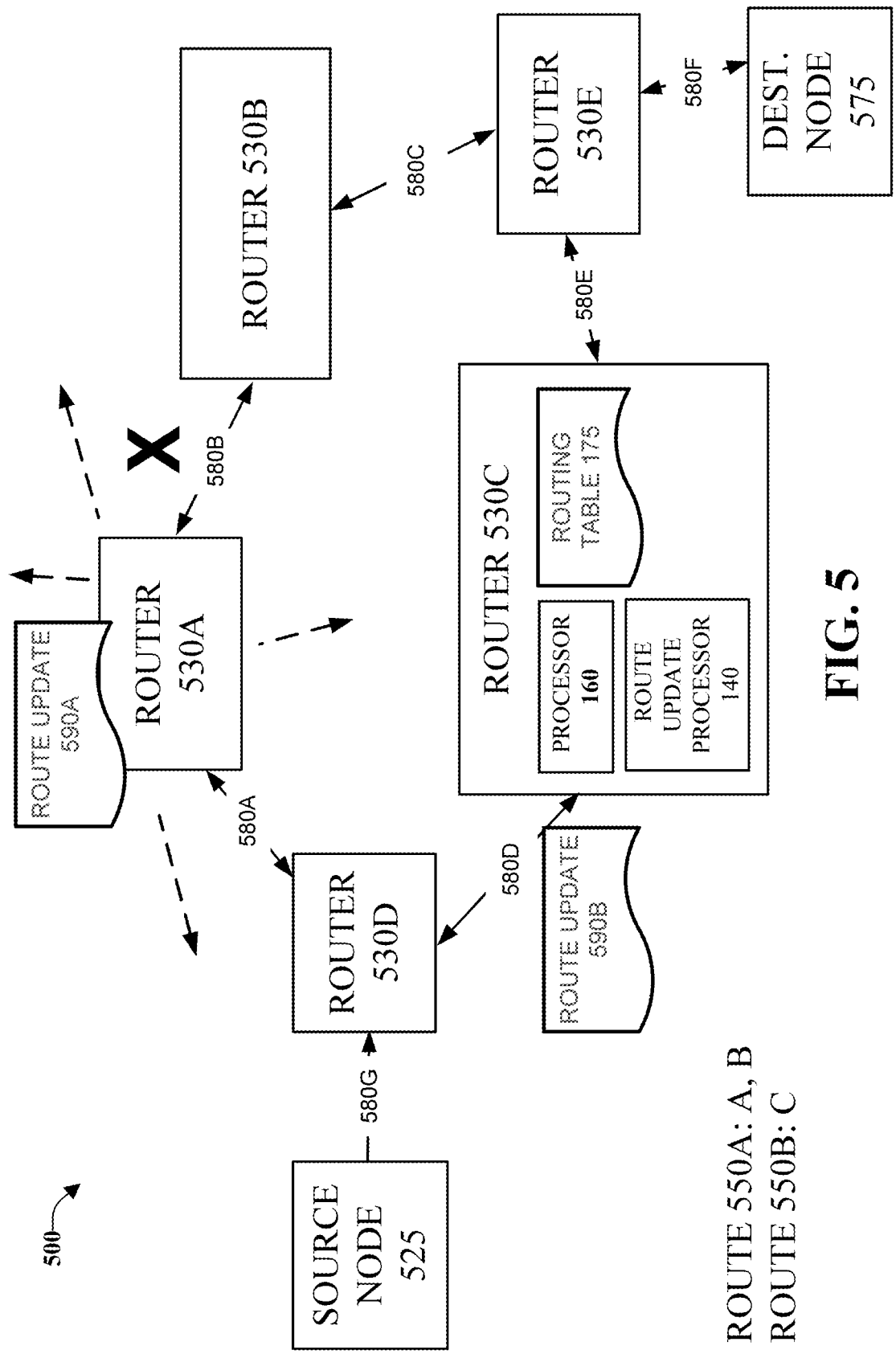
FIG. 5 illustrates another example node diagram of a network that can facilitate establishing a domain of authority for routing table updates from a routing device, in accordance with one or more embodiments.

FIG. 5 illustrates another example node diagram of a network 500 that can facilitate establishing a domain of authority for routing table updates from a routing device, in accordance with one or more embodiments. For purposes of brevity, description of like elements and/or processes employed in other embodiments is omitted.

Network 500 includes source router 530D, destination router 530E, routers 530A-530E, links 580A-G from source router 530D to destination router 530E, and inbound links 585A-E from destination router 530E to source router 530D. FIG. 5 can be used to illustrate different approaches that can be used by source router 530D to maintain routing table 175 and select between route 550A, from source router 530D to routers 530A-B, then to destination router 530E, and route 550B, from source router 530D to router 530C, then to destination router 530E, with destination router 530E being communicatively coupled to destination node 575.

As discussed above with network 400, in one or more embodiments, routers 530A-E can determine information about network route information, update a routing table, and share these updates with other nodes. It should be noted that, in example implementations, routing tables can be updated up to 500,000 times per second with current delay information determined from testing and from nearby nodes. As noted below, with some exceptions, any change in routing information identified by routers 530A-E are immediately propagated (e.g., using a flooding control protocol) to adjacent nodes, these nodes in some cases discussed below, further flooding the updated information to adjacent nodes.

In an example depicted in FIG. 5, router 530D, coupled to source node 525, can maintain routing table 175 based on information received by route update identifying component 125, from adjacent routers 530A and 530C about the operation of network 500. One having skill in the relevant art(s), given the description herein will appreciate other measures of network 500 operation, beyond the ones of this example, that can affect the maintenance of routing table 175.

As discussed further below, when considering the processing performed by route update processor 140 by one or more embodiments, it should be noted that, like the rapid and extensive propagation of route update 590A by router 530A, generally speaking, upon receipt and after processing, source router 530D can be configured to send out route update 590A to all adjacent routers, e.g., router 530C.

In one or more embodiments, because of the extensive generation and propagation of route updates 590A by routers 530A-E, the frequency of route updates 590A-B received by routers 530A-E can cause route update processing loads that exceed the capacity of available processing resources. With respect to the example routing tables being updated up to 500,000 times per second with current delay information noted above, by some estimations, processing capability of over a $100 \times 10^{12}$ floating point operations per second (100 teraFLOPS) can be required, potentially exceeding the processing capacity of a Central Processing Unit (CPU). As noted above, one approach that can be employed by one or more embodiments is to have specialized processing resources dedicated to processing route updates 590A, e.g., one or more route update processors 140.

In one or more embodiments, additional approaches can be employed that can reduce the likelihood that the processing capacity of one or more route update processors 140 will be exceeded by the processing of received route updates 590A. In an example system with frequent route updates being exchanged between routers, as well as frequent updates to routing tables 175, even with one or more dedicated and specialized route update processors 140, the route processing capacity of individual routers 530A-E can be insufficient to process and utilize the routing information available for use. In a further illustration of the route information processed by one or more embodiments, different processing tasks that can be performed by one or more embodiments are discussed further with FIG. 4 below. As discussed further below, one or more embodiments can reduce the route update processing load of routers 530A-E without reducing the quality of route data available for use for routing in routing table 175.

For example, to reduce the likelihood that the processing capacity of one or more route update processors 140 will be exceeded by the processing of received route updates 590A-B, one or more embodiments can employ features designed to reduce the number of route updates that are propagated from a router once received by the router. Thus, in some circumstances, route updates 590A-B are propagated to all adjacent nodes without analysis and with little restriction, and in other circumstances, this propagation is cut off, e.g., after the route update is too old to likely be useful.

One approach is to limit routing information propagated to adjacent routers based on different criteria. For example, network information identified by a router 530A-E can cause the generation and propagation of a route update 590A-B when a predicted utility of the routing information exceeds a threshold, e.g., a queuing delay at a node exceeds a value, or the bits per second of a network link 580A-G falls below a particular value. Other non-limiting, example approaches for predicting utility are discussed below, and with the discussion of FIG. 5.

As discussed further below, another way that the processing loads can be reduced for receiving routers 530A-E, is for the receiving nodes to perform as assessment of the route update upon receipt, before a more sophisticated level of processing is performed by route update processor 140. In one or more embodiments, this assessment can be a rapid operation that can determine the quality of the route update information, e.g., the comparison of a one or more metrics that can indicate quality to a threshold.

In one or more embodiments, the countdown of the TTL value for route update 590A can be commenced and decremented is different ways. Returning to the example above, upon identification of the routing information, router 530A can note a time. When generating route update 590A, in this example, to further remove processing tasks from router 530D, router 530A can precalculate what the TTL will be at the time of receipt by router 530D. In one or more embodiments, this can be performed based on a measurement by router 530A of values that include, but are not limited to, the control transmission queue delay for router 530A (e.g., the route update may have to wait for transmission) and the transmission time across link 580A, e.g., this value being collected (e.g., via a ping of router 530D) and stored for use in routing table 175. One having skill in the relevant art(s), given the description herein, will appreciate that other approaches can be used to manage the TTL of route updates 590A-B, in accordance with one or more embodiments.

Considering one effect of TTL in the operation of embodiments, in some circumstances, assessed route information quality can incorporate a discount in the quality of the information based on the age of the information, e.g., as time passes after the identification of routing information, the accuracy of the identified information can decline as a description of particular network conditions at a particular link. In one or more embodiments, older information can still provide useful information, but the use of the information takes potential inaccuracies into account in different ways. As discussed further below, one approach to this, used by this example, assigns a time to live (TTL) value to route update information, e.g., the route update is only propagated to adjacent routers for a particular duration. By stopping propagation of route update 530A-B, the further spread of this information can be limited. Assigning this value also, in one or more embodiments, can have the effect of limiting the influence of a router in both time and space. For this example, a 250 μsec TTL is used, but one having skill in the relevant art(s), given the description herein, would appreciate that other TTL durations can be selected, with different results.

Further, in one or more embodiments, the authority of individual routers 530A-E can be limited in time because of the TTL applied to route information identified by respective routers, and limited in space based on physical limits, e.g., the speed of light can limit the propagation of any information to approximately 46 miles per 250 μsec TTL, and the propagation medium can slow this down further. For example, in some implementations, the maximum propagation speed for a route update is ⅔ the speed of light, e.g., approximately 31 miles in fiber-optic cable. Thus, in this example, with links 580D and 580E being implemented with fiber-optic cable, a route update 590B generated by router 530D would not reach router 530E if the distance of link 580D exceeds 31 miles, e.g., by the time route update 590B reaches router 530C, the 250 μsec TTL for route update 590B has expired, and, while route update 590B can be utilized by router 530C, router 530C does not propagate route update 590B to router 530E.

As noted above, in one or more embodiments, TTL can be used to limit the propagation of route updates 590A-B, e.g., based on a geographical distance limit that comes from signal propagation. Further, as noted above, one or more embodiments can perform a quick assessment, e.g., comparing values of a route update to a threshold. In an example embodiments, these two concepts can be combined such that the only value considered with respect to the quality of the route update is the age of the update, e.g., as determined by the TTL at the time of receipt.

Additional examples of one or more embodiments limiting propagation of route updates are discussed below. Returning to the example discussed above, where router 530D receives route update 590A (e.g., with a round trip time of link 580B, determined by a ping of router 530B) from router 530A, upon receipt of route update 590A by router 530D, router 530D can either immediately forward the route update to all adjacent routers (e.g., including back to router 530A), or one or more embodiments can determine whether route update 590A satisfies one or more criteria for different potential destination routers, e.g., router 530A, and router 530C. It should be noted that one condition that can be applied to forwarding route updates is that the route update have a TTL greater than zero, e.g., during the TTL of a route update, it is more likely to be an accurate representation of network conditions, and thus should be forwarded, and after expiration of the TTL, the information may still be useful to the receiving node, but should not necessarily be forwarded to other nodes.

In addition to determining whether to propagate a route update, and whether to process route updates 590A-B, TTL can also be used to determine whether new information received from the route updates 590A-B should evict the information about the same network element from routing table 175. For example, as described in the example above, route update 590A can be generated based on a ping of router 530B by router 530A that measures the transmission speed of link 580B.

In one or more embodiments, results of a ping can determine one element of the potential delay of a path. As described throughout this disclosure, the delay of a path (also termed "path delay") can used for routing determinations made by a router. Further, routers can exchange path delays for routes for which information is available to the router, and this communication can facilitate data about links (e.g., route information) of network 500 being available to other routers in network 500. In one or more embodiments, when a router sends route information to another router, the sending router can add the delay of the link used for the sending, and thus can provide updated route information for entry into routing table 175.

In this example, route update 590A includes this measurement, and is received by router 530D. Upon receipt, in one or more implementations, the TTL of route update 590A can be identified. For example, route update evaluating component 126 determines a TTL of 250 μsec (e.g., starting TTL of 250 μsec TTL reduced by a 50 μsec transmission time for link 580A). In this example, because route update 590A arrives at router 530D with a positive TTL, this update is accepted for processing by route update processor 140. In one or more embodiments, TTL can be precalculated by the transmitting router because, in some embodiments, the transmitter router may be the only source of the example four elements of delay of the link for which route update 590A is distributed.

Continuing this example, during processing by route update processor 140, a prior value is identified that describes the transmission speed of link 580B. In one or more embodiments, route update processing can then proceed to compare the quality of the new route information in route update 590A and the currently stored information. This quality can be measured in different ways, with one approach being based on the content of the update (e.g., a delay based on transmission speed of link 580B) discounted by the age of the information, e.g., based on the amount the TTL has been reduced from the starting value (e.g., a TTL of 250 μsec). This approach used by one or more embodiments can be based in part on a concept that a lower delay value for link 580D is of higher quality than a higher delay value for link 580D, without considering the age of the delay values. To incorporate the age of the delay value with this quality, one or more embodiments can use different mathematical formulas to discount the quality value by also considering the remaining TTL of the route update.

Thus, based on the forgoing embodiments, in some examples, if an entry in routing table 175 has a delay for link 580B as 20 μsec, but the information is 300 μsec old, and a route update 590B is received that measures the link delay at 10 μsec with a TTL of 200 μsec, then the older, stored value of 20 μsec can be replaced by the new route update 590A supplied value of 10 μsec. In other examples, route information stored in routing table 175 can have been determined more recently than the information in route update 590B, and this, combined with the delay information, can lead to the opposite result, e.g., the information of route update 590B being unused for the updating of routing table 175. It is worth noting however that, in some circumstances, because of the rapid forwarding of route update 590B, and the example TTL of 200 μsec being above zero, route update 590B can be forwarded to router 530C, even though it is not used by router 530D. One having skill in the relevant art(s), given the description herein, would appreciate that this approaches, along with the approaches used by many other example features described herein, can combine a goal of rapid propagation of network updates (e.g., leading to more accurate routing) with a potential for inaccurate results, e.g., based on accurate updates being unused based on the age of the information. Different parameters have been described herein that would enable the implementation and tuning of one or more embodiments to achieve the results desired.

An example of determining and utilizing authority is illustrated with some approaches described with FIGS. 4 and 5 above, and network 400 of FIG. 4. In an example, source router 420 determines information corresponding to a delay between source router 420 and path router 430C, e.g., a delay of link 460D. In this example, route update 490A is generated and prepared to be transferred to all routers coupled to source router 420, e.g., including path router 430A. One way that some embodiments can increase the speed of processing at destination routers is to determine descriptive characteristics for the route updates before they are sent.

As described above with FIG. 5, TTL at the receiving router can be estimated based on the amount of time that has passed from original time of discovery of the routing information (e.g., 50 μs). In this example, based on a 250 μs maximum TTL, the TTL estimate attached to route update 490A is 200 μs, e.g., (250 μs−50 μs). In one or more embodiments, an estimated delay for a link that propagates the route update 490A can be combined with the determined age route update. For example, in one or more embodiments, a single value of route update delay can be stored for each destination network, and this value can be combined with a timestamp to calculate an instantaneous delay to use as described below to determine an authority of the route update. In this example, for delivery from source router 420 to path router 430A, routing table 175 of source router 420 has an instantaneous delay value of 30 μs for link 460A between source router 420 and path router 430A, and this can be used to estimate the delay from propagation of the route update.

Based at least on the age and delay described above, an authority value for route update 490A can be determined. In one or more embodiments, this authority value can be determined by source router 420 before the sending of route update 490A to router 430A. This determined authority value can be characterized as an authority value for route update 490A at the time that route update 490A is estimated to be received by the receiving router, e.g., path router 430A. In an example implementation using the example above, authority can have a maximum value (e.g., 1,000,000) that decreases based on the predicted age of the route update when it is received by the destination, e.g., 1,000,000/((Max TTL−Current TTL)+delay). Thus, in this example, using the 50 μs example from above, the base authority for route update 490A at the time it is prepared for transmission to path router 430A is 20000, e.g., 1,000,000/((250−200)+30). To estimate the authority value at the time of receipt by path router 430A, the 170 μs estimated TTL is used from the example above. Thus, at the time of receipt by path router 430A, the authority value for route update 490A is 12500, e.g., 1,000,000/((250 μs−170 μs)+30 μs). One having skill in the relevant art(s), given the description herein, would note the 37.5% reduction in authority based on the 30 μs instantaneous delay for link 460D. These estimates for authority and TTL at the time of receipt by path router 430A are included with route update 490A.

As noted above, upon receipt by path router 430A, route update 490A can be compared to an existing value corresponding to the information stored in routing table 175. In an example entry in routing table 175 of path router 430A, an entry for link 460D (e.g., a transmission time for travel to path router 430C), is 150 μs old at the time of receipt by path router 430A. In one or more embodiments, authority can be determined for this routing table 175 entry at the time route update 490A is received. Thus, in this example, the TTL for the routing table entry is 100 μs, e.g., 250−150. Further, in this example, the authority value determined for the routing table entry is 10,000, e.g., 1,000,000/((250−150)+0 delay). This 10000 can be compared to the 12500 authority value of route update 490A, and because the authority value of route update 490A exceeds the authority value of the routing table entry, the information of the route update replaces the routing table 175 information for link 460D. In this way, an authority value of a route update can be characterized as a priority of the route update compared to the priorities of other information. It should be noted that, in one or more embodiments, the authority of entries stored in a routing table can be instantaneously calculated value, e.g., not stored, but calculated at the time the eviction analysis described above occurs.

One having skill in the relevant art(s), given the description herein, would appreciate that the link 460D delay information can be used to update any entry in routing table 175 that is based on this link delay. For example, in routing table 175, for path router 430A, an entry for an estimated transmission time to path router 430E can be updated, because a route to this router travels by link 460D. The example approach described above for determining and utilizing authority values is non-limiting, and approaches and implementation specifics can be selected, e.g., the scale of the authority value and the rate at which the authority value is decreased over time.

Based on the foregoing, it would be apparent to one having skill in the relevant art(s), given the description there that, in some implementations, it is determined authority, not just a magnitude of delay, that can determine the utilization of routing information. Stated differently, it can be more advantageous to one or more embodiments to use an update that originated from a close-by source, even if it is not an improvement in delay, than to use an obsolete update from farther away that appears to indicate better conditions than the more recent update.

Figure 6:
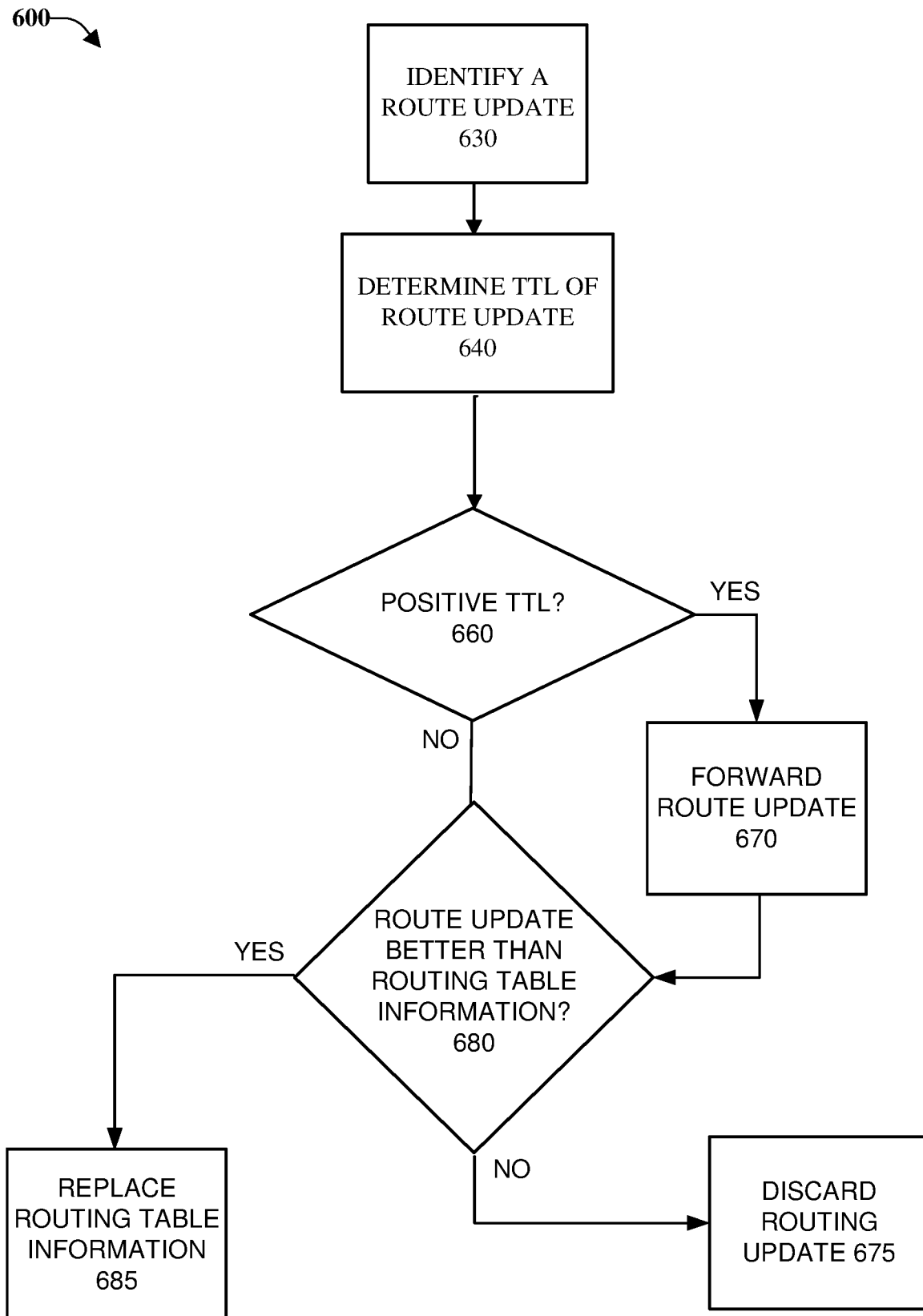
FIG. 6 depicts a process whereby the above described processes can define authority domains with TTL limits on route updates and evaluation by routers receiving the updates, in accordance with one or more embodiments.

FIG. 6 depicts a process whereby the above described processes can define authority domains with TTL limits on route updates and evaluation by routers receiving the updates, in accordance with one or more embodiments. For purposes of brevity, description of like elements and/or processes employed in other embodiments is omitted.

At 630, an update to route information about the network can be identified. At 640, a TTL value can be determined for the information of the route update. At 660, the TTL can be determined to be positive or not, e.g., zero or negative. When the TTL is determined to be positive, at 670, the route update can be forwarded to other routing devices. As described with FIG. 2 above, this forwarding of a route update can expand the authority of the originating router of the route update, e.g., expand the authority domain of the route update to other routing devices within the network.

When the TTL is determined not to be positive, and after 670 is completed (if appropriate), at 680, in an opposite result to 670 above the received route update is not forwarded. By not forwarding the route update, one or more embodiments can limit the authority domain of the originating router, thus improving, in some circumstances, the relationship between the useful information propagated and the processing required to process the information. For example, by limiting the propagation of the route update (e.g., such as the limiting of propagation from path router 430A to path router 430B in the example of FIG. 4), one or more embodiments can reduce the processing (e.g., by router 430B) of route information that has a lower likelihood of being accurate (e.g., because of age) and relevant (e.g., because of the distance from the originating router). Stated differently, in one or more embodiments, route updates can be accepted by routers, even on very long links, though they can be handled in different ways, based on age, e.g., a cut off in forwarded based on age can be implemented.

One having skill in the relevant art(s), given the description herein will appreciate that different parameters (e.g., max TTL, conditions where route updates are forwarded, authority determining approaches) can be adjusted based on the characteristics of different implementation environments, including, but not limited to processing power available at routers, likelihood of error, low latency requirements for network communication.

Continuing this example, at 680, when the route information is determined to be better (e.g., have a higher authority) than the information stored in the routing table, the route information can replace the information stored in the routing table. Alternatively, when the route information is determined not to be better than the information stored in the local routing table, at 675 the routing update can be discarded.

Figure 7:
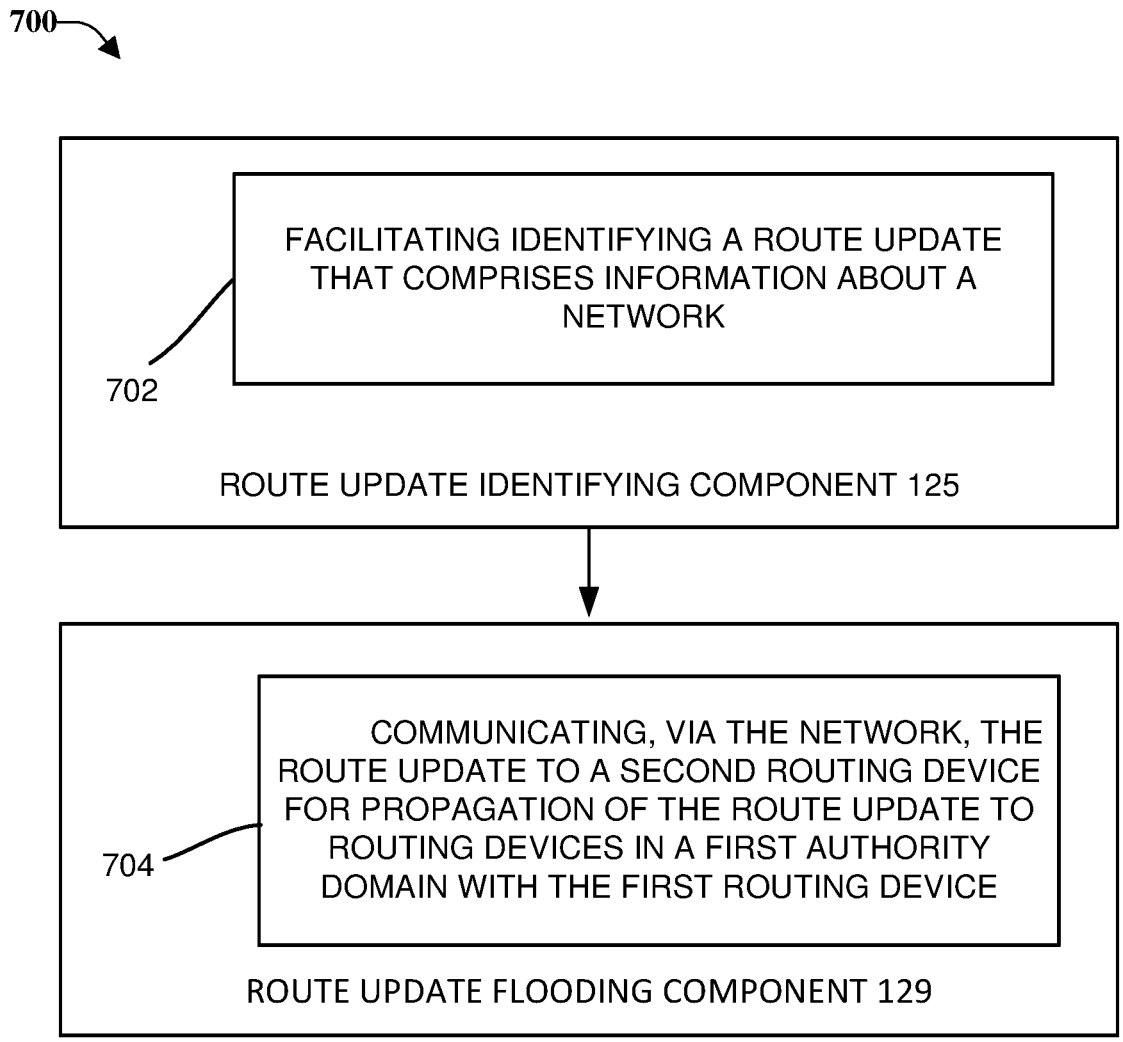
FIG. 7 is a flow diagram representing example operations of an example system that can facilitate establishing a domain of authority for routing table updates from a routing device, in accordance with one or more embodiments.

FIG. 7 is a flow diagram representing example operations of an example system 700 that can comprise a route update identifying component 125, route update evaluating component 126, and routing table updating component 128, that can facilitate establishing a domain of authority for routing table updates from a routing device, in accordance with one or more embodiments. For purposes of brevity, description of like elements and/or processes employed in other embodiments is omitted.

Route update identifying component 125 can be configured 702 to facilitate identifying a route update that comprises information about a network, in accordance with one or more embodiments. For example, in one or more embodiments, route update identifying component 125 can be configured 702 to facilitate identifying a route update that comprises information about a network. Route update flooding component 129 can be configured 704 to facilitate communicating, via the network, the route update to a second routing device for propagation of the route update to routing devices in a first authority domain with the first routing device, in accordance with one or more embodiments. For example, in one or more embodiments, route update identifying component 125 can be configured 704 to facilitate communicating, via the network, the route update to a second routing device for propagation of the route update to routing devices in a first authority domain with the first routing device.

Figure 8:
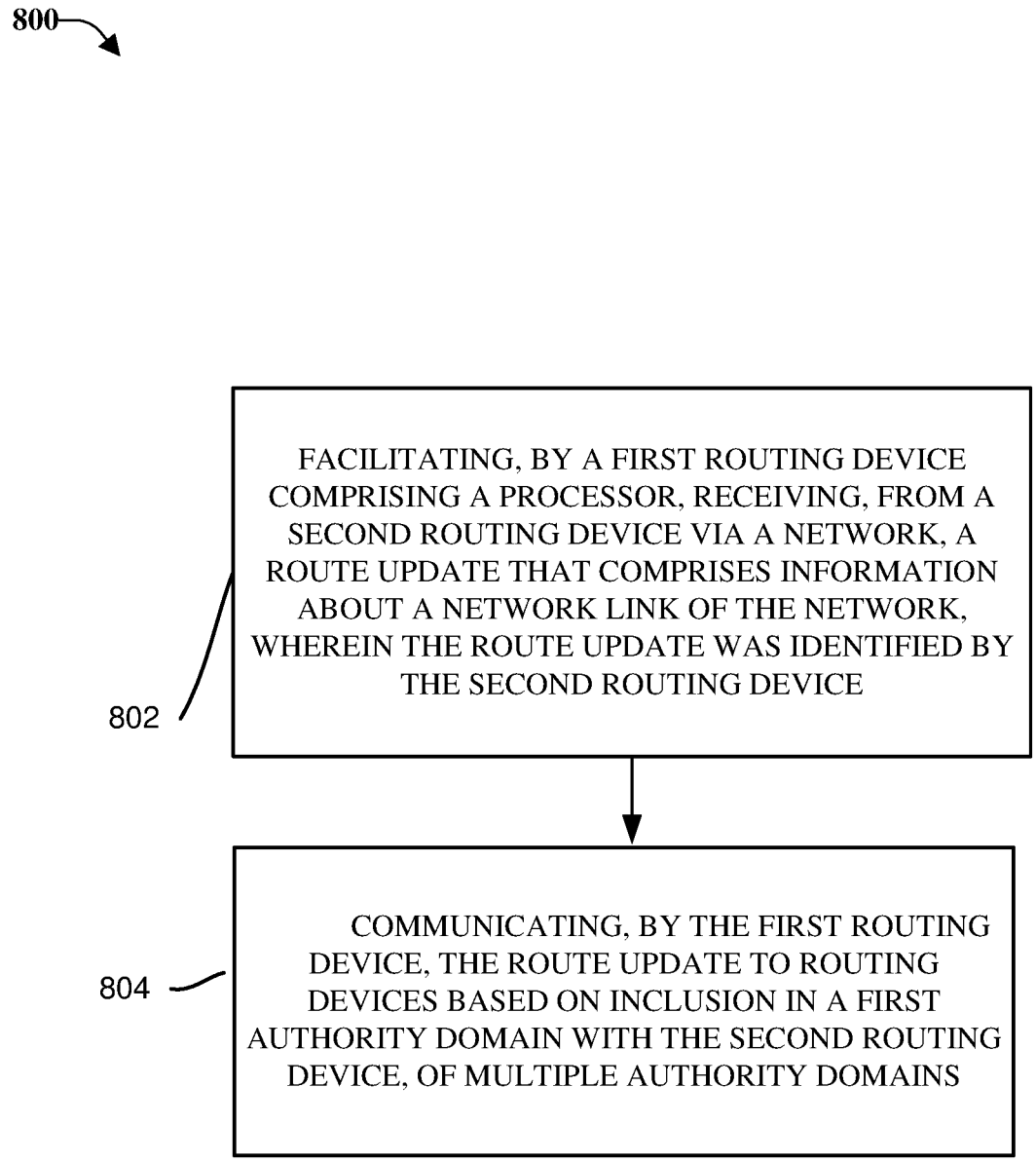
FIG. 8 illustrates a flow diagram of an example method that can facilitate establishing a domain of authority for routing table updates from a routing device, in accordance with one or more embodiments.

FIG. 8 illustrates a flow diagram of an example method 700 that can facilitate establishing a domain of authority for routing table updates from a routing device, in accordance with one or more embodiments. For purposes of brevity, description of like elements and/or processes employed in other embodiments is omitted.

At 802, method 800 can comprise facilitating, by a first routing device comprising a processor, receiving, from a second routing device via a network, a route update that comprises information about a network link of the network, wherein the route update was identified by the second routing device. For example, in one or more embodiments, method 800 can comprise facilitating, by a first routing device 150 comprising a processor 160, receiving (e.g., using route update identifying component 125), from a second routing device 180 (e.g., using route update flooding component 129) via a network 190, a route update 590A that comprises information about a network link 580B of network 500, wherein the route update was identified by the second routing device 530A.

At 804, method 800 can comprise communicating, by the first routing device, the route update to routing devices based on inclusion in a first authority domain with the second routing device, of multiple authority domains. For example, in one or more embodiments, method 800 can comprise communicating, by the first routing device 530A, the route update 590A to routing devices 530D based on inclusion in a first authority domain with the second routing device, of multiple authority domains.

Figure 9:
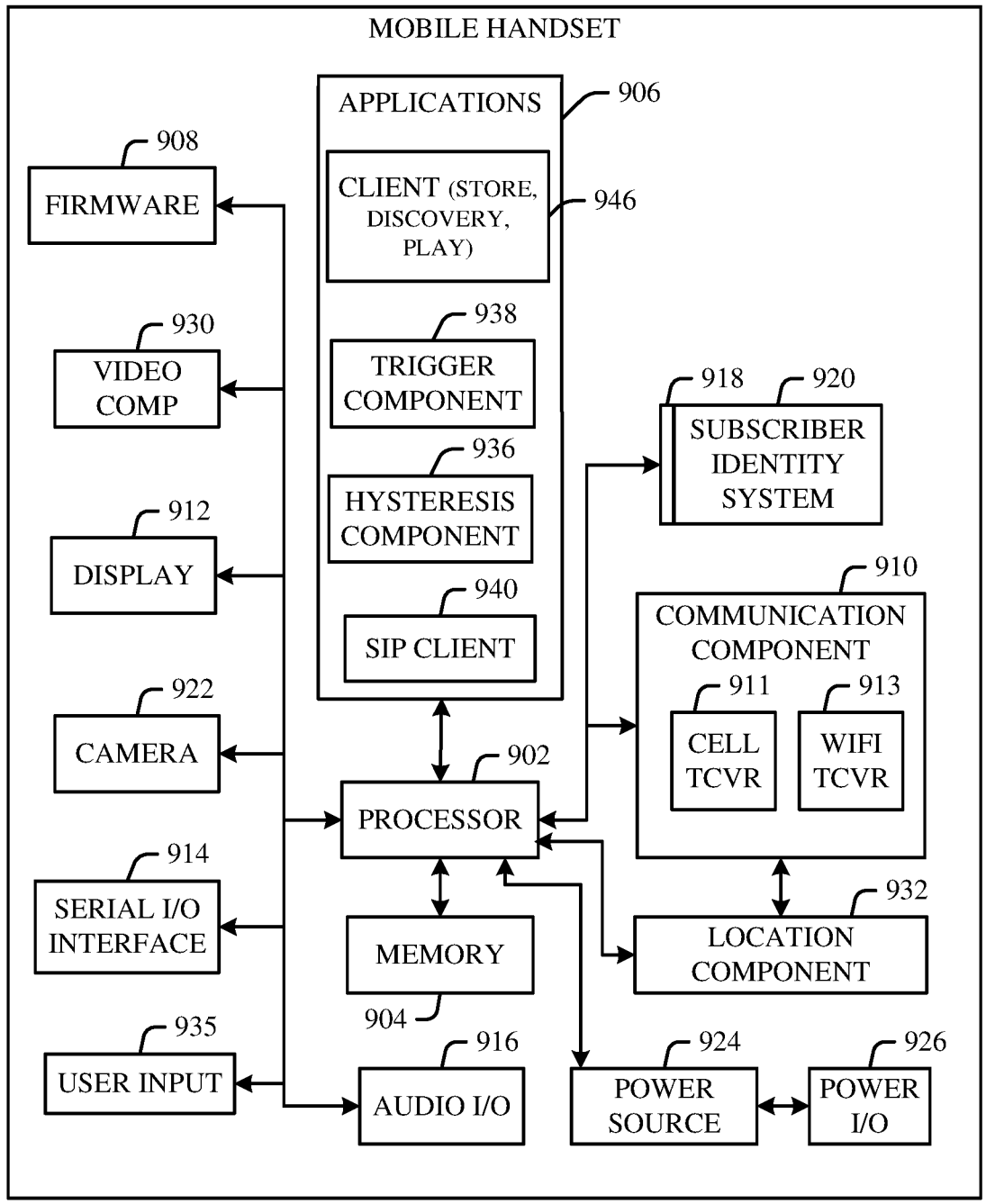
FIG. 9 illustrates an example block diagram of a mobile handset operable to engage in a system architecture that facilitates wireless communications according to one or more embodiments described herein.

FIG. 9 illustrates an example block diagram of a mobile handset 900 operable to engage in a system architecture that facilitates wireless communications according to one or more embodiments described herein. For purposes of brevity, description of like elements and/or processes employed in other embodiments is omitted. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the embodiments also can be implemented in combination with other program modules and/or as a combination of hardware and software.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1294) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or a decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

One or more devices described herein can be connected to one or more communication service provider networks via one or more backhaul links or the like (not shown). For example, the one or more backhaul links can comprise wired link components, such as a T1/E1 phone line, a digital subscriber line (DSL) (e.g., either synchronous or asynchronous), an asymmetric DSL (ADSL), an optical fiber backbone, a coaxial cable, and the like.

It should be understood that any of the examples and terms used herein are non-limiting. For instance, while examples are generally directed to non-standalone operation where the NR backhaul links are operating on mmWave bands and the control plane links are operating on sub-6 GHz LTE bands, it should be understood that it is straightforward to extend the technology described herein to scenarios in which the sub-6 GHz anchor carrier providing control plane functionality could also be based on NR. As such, any of the examples herein are non-limiting examples, any of the embodiments, aspects, concepts, structures, functionalities or examples described herein are non-limiting, and the technology may be used in various ways that provide benefits and advantages in radio communications in general.

One or more embodiments can employ various cellular systems, technologies, and modulation schemes to facilitate wireless radio communications between devices. While example embodiments include use of 5G new radio (NR) systems, one or more embodiments discussed herein can be applicable to any radio access technology (RAT) or multi-RAT system, including where user equipment operate using multiple carriers, e.g. LTE FDD/TDD, GSM/GERAN, CDMA2000, etc. For example, a wireless communication system can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the user equipment. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system 100 can be configured to provide and employ 5G wireless networking features and functionalities. With 5G networks that may use waveforms that split the bandwidth into several sub bands, different types of services can be accommodated in different sub bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Figure 10:
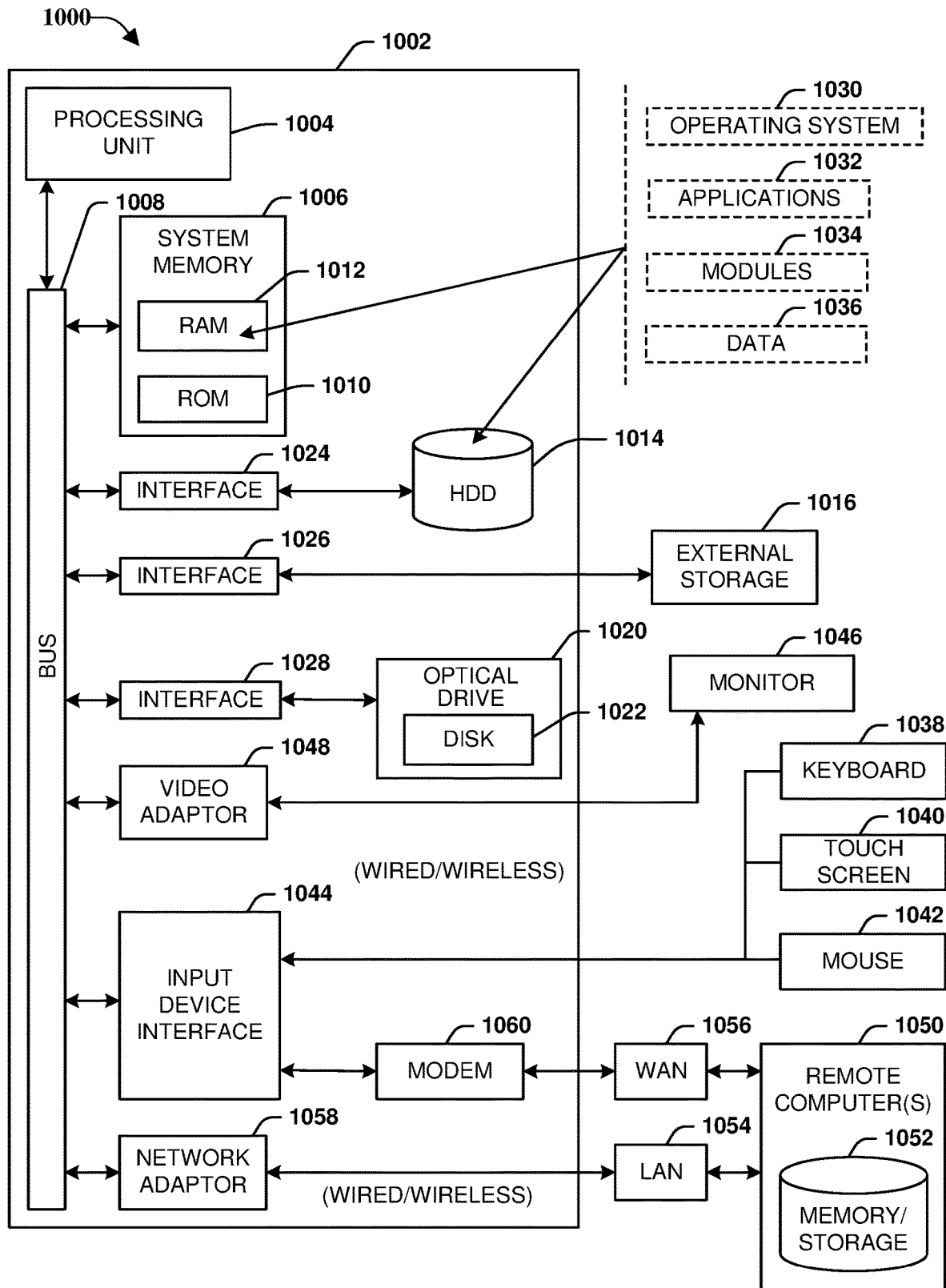
FIG. 10 illustrates an example block diagram of an example computer operable to engage in a system architecture that can facilitate processes described herein, in accordance with one or more embodiments.

Referring now to FIG. 10, in order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software. For purposes of brevity, description of like elements and/or processes employed in other embodiments is omitted.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and nonremovable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium. Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., WAN 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "network device," "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that can serve and receive data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipment do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the embodiments are not to be limited to any single implementation, but rather is to be construed in breadth, spirit and scope in accordance with the appended claims.

What is claimed is:

1. First routing equipment, comprising:
   a processor; and
   a memory that stores executable instructions that, when the executable instructions are executed by the processor, facilitate performance of operations, comprising:
      identifying a route update that comprises information about a network link enabled via a network,
      identifying a distance traveled by the route update to the first routing equipment from a source of the route update, and
      based on the distance traveled by the route update, communicating the route update to at least some of second routing equipment, wherein the route update is communicated to the at least some of the second routing equipment that are within a threshold distance of travel from the source of the route update, wherein the threshold distance is set based on a capability of the second routing equipment to receive the route update via network links of the network from the first routing equipment, within a period of time,
      wherein the distance traveled by the route update determines which of the second routing equipment are in a defined domain of authority and the defined domain of authority is expanded by propagating the route update to one or more of the second routing equipment outside of the defined domain of authority while within the period of time.

2. The first routing equipment of claim 1, wherein the operations further comprise:
   based on the distance traveled by the route update, estimating a value of the route update with respect to an ability to describe the network link, resulting in an evaluated value of the route update, wherein communicating the route update is further based on the evaluated value of the route update.

3. The first routing equipment of claim 2, wherein estimating the value of the route update comprises estimating the value of the route update based on a likelihood of accurately reflecting a present status of the network link according to an accuracy criterion.

4. The first routing equipment of claim 1, wherein the threshold distance is set further based on respective capabilities of receiving communications by respective ones of the second routing equipment within a period of time.

5. The first routing equipment of claim 4, wherein the network comprises third routing equipment that is unable to receive the routing update within the period of time, and wherein the operations further comprise, communicating the route update to the third routing equipment.

6. The first routing equipment of claim 1, wherein the threshold distance is set further based on a speed of signal propagation associated with signals communicated via the network link.

7. The first routing equipment of claim 1, wherein communicating the route update to the at least some of the second routing equipment comprises communicating the route update to the at least some of the second routing equipment asynchronously, in response to identifying the route update.

8. The first routing equipment of claim 1, wherein the threshold distance is set to select a number of devices to be used for communication of the route update.

9. The first routing equipment of claim 1, wherein the operations further comprise, updating a routing table of the first routing equipment in accordance with the route update.

10. A method, comprising:
    facilitating, by a first routing device comprising a processor, receiving, from a second routing device via a network, a route update that comprises information about a network link of the network; and
    based on a distance traveled by the route update from a place of generation of the route update to the first routing device, propagating the route update to routing devices based on inclusion of the second routing device in a defined domain of authority with the first routing device, of multiple authority domains; and
    determining a time to live (TTL) limit associated with the defined domain of authority;
    wherein the propagating the route update comprises further propagating among the routing devices based on respective distances of travel from the generation of the route update to the routing devices within the TTL limit; and
    wherein the defined domain of authority is expanded by propagating the route update to one or more routing devices outside of the defined domain of authority while the determined TTL limit is positive.

11. The method of claim 10, wherein the route update having communicated to the routing devices is used by the routing devices when the TTL limit has expired.

12. The method of claim 10, wherein receiving the route update from the second routing device comprises receiving the route update synchronously, at a defined time interval.

13. The method of claim 12, wherein propagating the route update synchronously is facilitated by the second routing device having been determined to be in the defined domain of authority with the first routing device.

14. The method of claim 10, wherein the second routing device is directly coupled to the first routing device in the network, and wherein a third routing device receives the route update based on the third routing device being determined to be in the defined domain of authority with the first routing device.

15. The method of claim 10, further comprising, propagating, by the first routing device, the route update to a third routing device in a first defined domain of authority defined based on propagation via network links of the network originating from the third routing device, within a respective distance of travel from the generation of the route update to the third routing device.

16. The method of claim 11, wherein the route update having communicated to the routing devices is not further propagated when the TTL limit has expired.

17. A non-transitory machine-readable storage medium comprising executable instructions that, when executed by a processor of a first routing device, facilitate performance of operations, the operations comprising:
  receiving, from a second routing device via a network, a route update that comprises information relating to a network link enabled via the network, wherein the route update was identified by the second routing device; and
  based on a distance traveled by the route update, propagating the route update to a group of routing devices, wherein the route update is further propagated among the group of routing devices, to the group of routing devices having been determined to be within a threshold distance of travel from generation of the route update within a time to live limit (TTL),
  wherein the distance traveled by the route update determines which of the group of routing equipment are in a defined domain of authority and the defined domain of authority is expanded by propagating the route update to one or more routing devices outside of the defined domain of authority while the TTL limit is positive.

18. The non-transitory machine-readable storage medium of claim 17, wherein the operations further comprise, based on the distance traveled by the route update, estimating a value of the route update relating to the network link, resulting in an evaluated value of the route update, and wherein propagating the route update is further based on the evaluated value of the route update.

19. The non-transitory machine-readable storage medium of claim 18, wherein the value of the route update is estimated based on a likelihood that a present status the network link is accurate.

20. The non-transitory machine-readable storage medium of claim 19, wherein the threshold distance is determined based on a capability of receiving communications by the group of routing devices within the TTL limit.

* * * * *